US007877173B2

(12) United States Patent
Liu et al.

(10) Patent No.: US 7,877,173 B2
(45) Date of Patent: Jan. 25, 2011

(54) METHOD AND APPARATUS FOR DETERMINING A SATELLITE ATTITUDE USING CROSSLINK REFERENCE SIGNALS

(75) Inventors: Ketao Liu, Cerritos, CA (US); Yeong-Wei A. Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 769 days.

(21) Appl. No.: 11/825,207

(22) Filed: Jul. 5, 2007

(65) Prior Publication Data

US 2009/0012662 A1 Jan. 8, 2009

(51) Int. Cl.
*G05D 1/00* (2006.01)
(52) U.S. Cl. .......................... 701/13; 701/4; 342/357.11
(58) Field of Classification Search .................. 701/4, 701/13; 342/357.11
See application file for complete search history.

(56) References Cited

U.S. PATENT DOCUMENTS

| 5,959,576 | A | 9/1999 | Ring |
| 6,108,593 | A * | 8/2000 | Didinsky et al. .............. 701/13 |
| 6,195,044 | B1 * | 2/2001 | Fowell ....................... 342/367 |
| 6,219,593 | B1 | 4/2001 | Kroncke |
| 6,778,886 | B2 | 8/2004 | Hunt |

* cited by examiner

*Primary Examiner*—Mark Hellner
*Assistant Examiner*—Helal A Algahaim
(74) *Attorney, Agent, or Firm*—Gates & Cooper LLP

(57) ABSTRACT

A method and apparatus for determining the attitude of a satellite using crosslink information is disclosed. The method and apparatus integrates data from the crosslinks with data available from other sources including, for example, star sensors, inertial sensors, and earth limb sensors to derive an accurate estimate of the satellite attitude, even in harsh nuclear environments.

22 Claims, 8 Drawing Sheets

METHOD AND APPARATUS FOR DETERMINING A SATELLITE ATTITUDE USING CROSSLINK REFERENCE SIGNALS

BACKGROUND

1. Technical Field

The present disclosure relates to systems and methods for determining the attitude of an operational satellite, and in particular to a system and method for determining the attitude of a satellite in harsh environments using crosslink reference signals.

2. Description of the Related Art

Communications satellites are artificial satellites that are deployed in space for the purpose of telecommunications. Depending on the desired mission, constellations of such satellites are deployed in the appropriate orbit, which may include geostationary, mid-Earth, low-Earth, polar, equatorial, or Molniya orbits. One of the advantages of such satellite systems is that they can be used to implement worldwide communications at low cost.

In many cases, the satellite communications system is required to provide communications using spot beams and/or laser beams with high precision. This requires that the satellite be capable of determining its attitude to a high degree of accuracy for spot beam pointing and laser beam acquisition and tracking. Ordinarily, such determinations can be made using star sensors and the like. However, such sensors may not be effective in the presence of either localized or distant man-made nuclear environments. Other sensors, such as nuclear survivable MMS Earth Sensors (Multi-Mission Earth Sensors) are available. However, such sensors do not meet the satellite attitude measurement accuracy requirements for some applications.

Other methods for determining satellite attitude have been proposed. For example, U.S. Pat. No. 5,959,576 discloses a system that determines the host satellite's attitude using the global positioning system (GPS) receiver signals from the host satellite and signals provided through other satellites through laser communications links. The signals consist of ephemeris data from GPS receivers in the other satellites. However, such data is not used in the satellite's existing attitude determination system to enhance the accuracy of the satellite's determination of its attitude when Earth/Sun sensors are used with continuously running inertial sensors (such as gyros and accelerometers) or when star trackers are used with such inertial sensors. Hence, the GPS receiver signals do not provide results to acceptable accuracy for many missions, particularly in harsh environments.

U.S. Pat. No. 6,219,593 determines the host satellite attitude using laser communications crosslink data and a well-known TRIAD algorithm, which is similar to that which is disclosed in U.S. Pat. No. 5,959,576. Methods to acquire the crosslink signal are also disclosed. U.S. Pat. No. 6,778,886 discloses a laser transmission/reception system providing range data measurements for a host satellite to determine its position from at least three other satellites. However, this data in these systems is not used in the satellite's existing attitude determination system to enhance the accuracy of the satellite's determination of its attitude, and consequently, this system also does not meet the accuracy requirements for many missions, particularly in harsh environments.

What is needed is a system and method for using crosslink data to improve the satellite's determination of its attitude, particularly in harsh environments. The present invention satisfies this need.

SUMMARY

To address the requirements described above, this document discloses a method and apparatus for determining the attitude of a first satellite. One of the disclosed embodiments is evidenced by a method comprising the steps of receiving a crosslink signal from a second satellite, computing a measured vector $\tilde{r}^{Body}$ between the first satellite and the second satellite from the crosslink signal, computing a predicted vector $\hat{r}^{Body}$ between the first satellite and the second satellite, computing crosslink measurement residuals $\Delta r$ as a difference between the computed predicted vector between the first satellite and the second satellite and the computed measured vector between the first satellite and the second satellite $\tilde{r}^{Body} - \hat{r}^{Body}$, computing estimated attitude errors from a current estimated attitude, the crosslink measurement residuals, and position sensor measurement residuals, wherein the position sensor measurement residuals are computed from the current estimated attitude, the attitude position sensor error parameters and the crosslink measurement residuals $\Delta r$, and correcting and propagating the current estimated satellite attitude using the computed estimated attitude errors. In one embodiment, the apparatus comprises a receiver, disposed on a first satellite, the receiver for receiving a crosslink signal from a second satellite, and a processor, having a plurality of modules, including: a first module for computing a measured vector $\tilde{r}^{Body}$ between the first satellite and the second satellite from the crosslink signal; a second module for computing a predicted vector $\hat{r}^{Body}$ between the first satellite and the second satellite; a third module for computing crosslink measurement residuals $\Delta r$ as a difference between the computed predicted vector between the first satellite and the second satellite and the computed measured vector between the first satellite and the second satellite $\tilde{r}^{Body} - \hat{r}^{Body}$; a third module for computing estimated attitude errors from a current estimated attitude, the crosslink measurement residuals, and position sensor measurement residuals, wherein the position sensor measurement residuals are computed from the current estimated attitude the position sensor error parameters and the crosslink measurement residuals $\Delta r$; and a fourth module for correcting and propagating the current estimated satellite attitude using the computed estimated attitude errors.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments. It is understood that other embodiments may be utilized and structural changes may be made without departing from the scope of the present disclosure.

Figure 1:
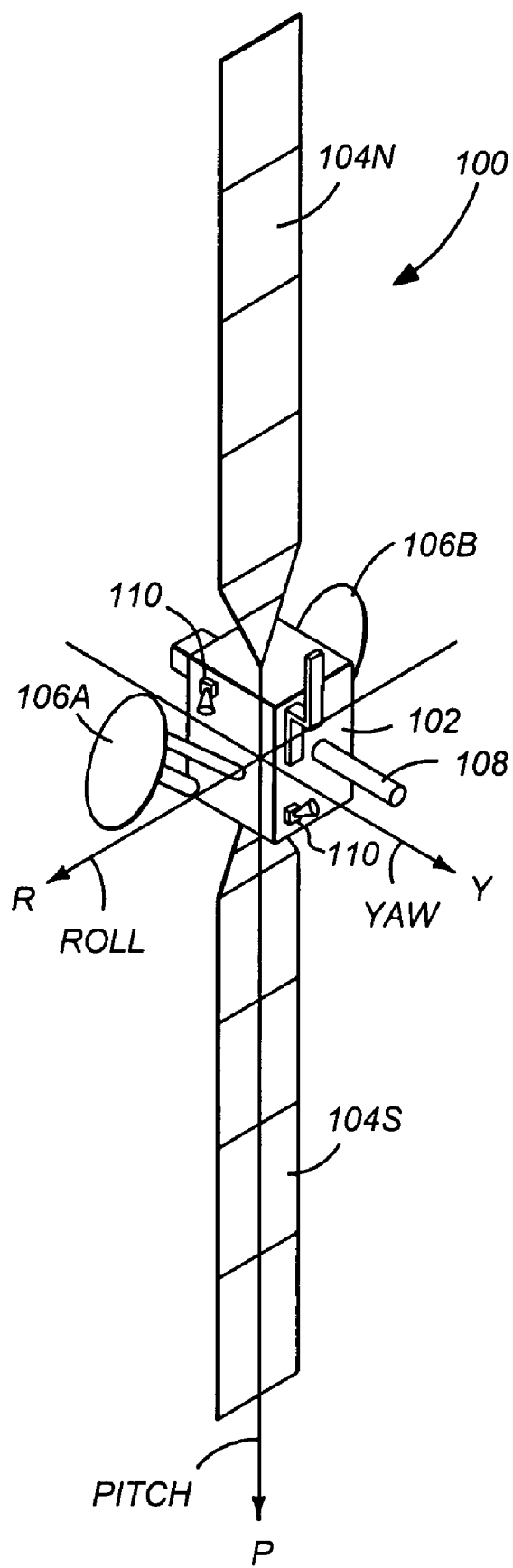
FIG. 1 is an illustration of a three-axis stabilized satellite.

FIG. 1 illustrates a three-axis stabilized satellite or satellite 100. The satellite 100 is preferably situated in a stationary orbit about the Earth. The satellite 100 has a main body 102, a pair of solar panels 104, two or more crosslink communications antennas 106A, 106B for communicating with other satellites, and a telemetry and command omnidirectional antenna 108 which is aimed at a control ground station. In one embodiment, the crosslink communication systems 106A, 106B are gimbaled so that they are capable of being oriented in different directions independently from the satellite main body 102. In one embodiment, the crosslink communications system operates using laser generated energy but energy at other frequencies can also be used. For example, phased array antennae could be used for crosslink communications, thus using RF frequencies and obviating the need for a gimbal.

The satellite 100 also includes one or more antennas for communicating with transceivers located on the Earth. The satellite 100 may also include one or more sensors 110 to measure the attitude of the satellite 100. These sensors may include Sun sensors, Earth sensors, and star sensors. Since the solar panels are often referred to by the designations "North" and "South", the solar panels in FIG. 1 are referred to by the numerals 104N and 104S for the "North" and "South" solar panels, respectively.

The three axes of the satellite 100 are shown in FIG. 1. The pitch axis P lies along the plane of the solar panels 140N and 140S. The roll axis R and yaw axis Y are perpendicular to the pitch axis P and lie in the directions and planes shown. The antenna 108 points to the Earth along the yaw axis Y.

Figure 2:
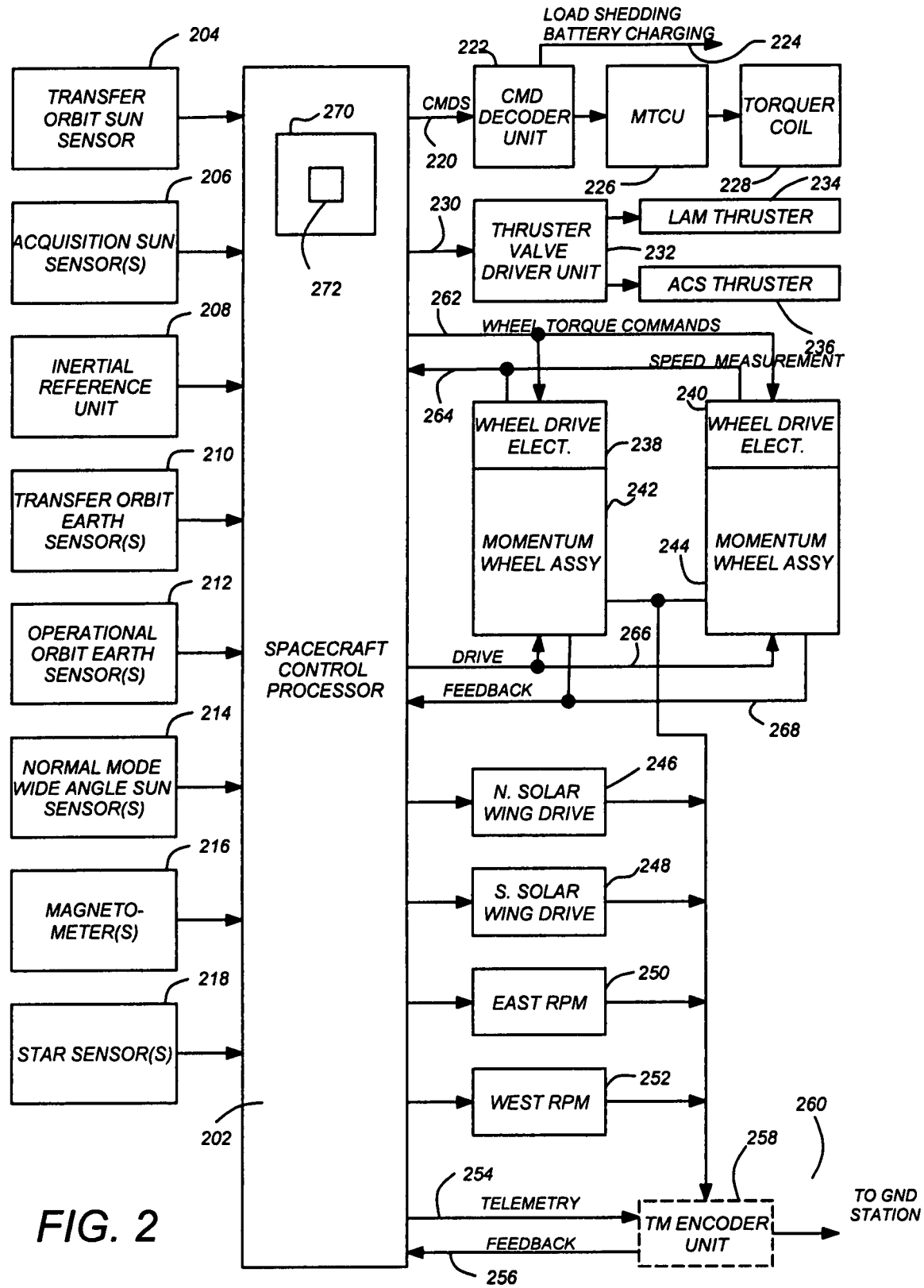
FIG. 2 is a diagram depicting the functional architecture of a representative attitude determination and control system.

FIG. 2 is a diagram depicting the functional architecture of a representative attitude control system. Control of the satellite is provided by a computer or satellite control processor (SCP) 202. The SCP performs a number of functions which may include post ejection sequencing, transfer orbit processing, acquisition control, stationkeeping control, normal mode control, mechanisms control, fault protection, and satellite systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, Sun search/acquisition, Earth search/acquisition, and stellar attitude acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanism's mode control could include solar panel control and reflector positioning control. The satellite control systems support could include tracking and command processing, battery charge management and pressure transducer processing.

Input to the satellite control processor 202 may come from any combination of a number of satellite components and subsystems, such as a transfer orbit Sun sensor 204, an acquisition Sun sensor 206, an inertial reference unit 208, a transfer orbit Earth sensor 210, an operational orbit Earth sensor 212, a normal mode wide angle Sun sensor 214, a magnetometer 216, and one or more star sensors 218.

The SCP 202 generates control signal commands 220 that are directed to a command decoder unit 222. The command decoder unit operates the load shedding and battery charging systems 224. The command decoder unit also sends signals to the magnetic torque control unit (MTCU) 226 and the torquer coil 228.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The satellite control processor also sends jackscrew drive signals 266 to the momentum wheel assemblies 243 and 244. These signals control the operation of the jackscrews individually and thus the amount of tilt of the momentum wheels. The position of the jackscrews is then fed back through command signal 268 to the satellite control processor. The signals 268 are also sent to the telemetry encoder unit 258 and in turn to the ground station 260.

The satellite control processor also sends command signals 254 to the telemetry encoder unit 258 that in turn sends feedback signals 256 to the SCP 202. This feedback loop, as with the other feedback loops to the SCP 202 described earlier, assist in the overall control of the satellite. The SCP 202 communicates with the telemetry encoder unit 258, which receives the signals from various satellite components and subsystems indicating current operating conditions, and then relays them to the ground station 260.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the satellite as required.

The use of reaction wheels or equivalent internal torquers to control a momentum bias stabilized satellite allows inversion about yaw of the attitude at will without change to the attitude control. In this sense, the canting of the momentum wheel is entirely equivalent to the use of reaction wheels.

Other satellite employing external torquers, chemical or electric thrusters, magnetic torquers, solar pressure, etc. cannot be inverted without changing the control or reversing the wheel spin direction. This includes momentum bias satellite that attempt to maintain the satellite body fixed and steer payload elements with payload gimbals.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The satellite 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device.

Further, the operating system 272 and the computer program are comprised of instructions which, when read and executed by the SCP 202, causes the satellite processor 202 to perform the steps necessary to implement and/or use the present invention. Computer program and/or operating instructions may also be tangibly embodied in memory 270 and/or data communications devices (e.g. other devices in the satellite 100 or on the ground), thereby making a computer program product or article of manufacture according to the invention. As such, the terms "program storage device," "article of manufacture" and "computer program product" as used herein are intended to encompass a computer program accessible from any computer readable device or media.

Figure 3:
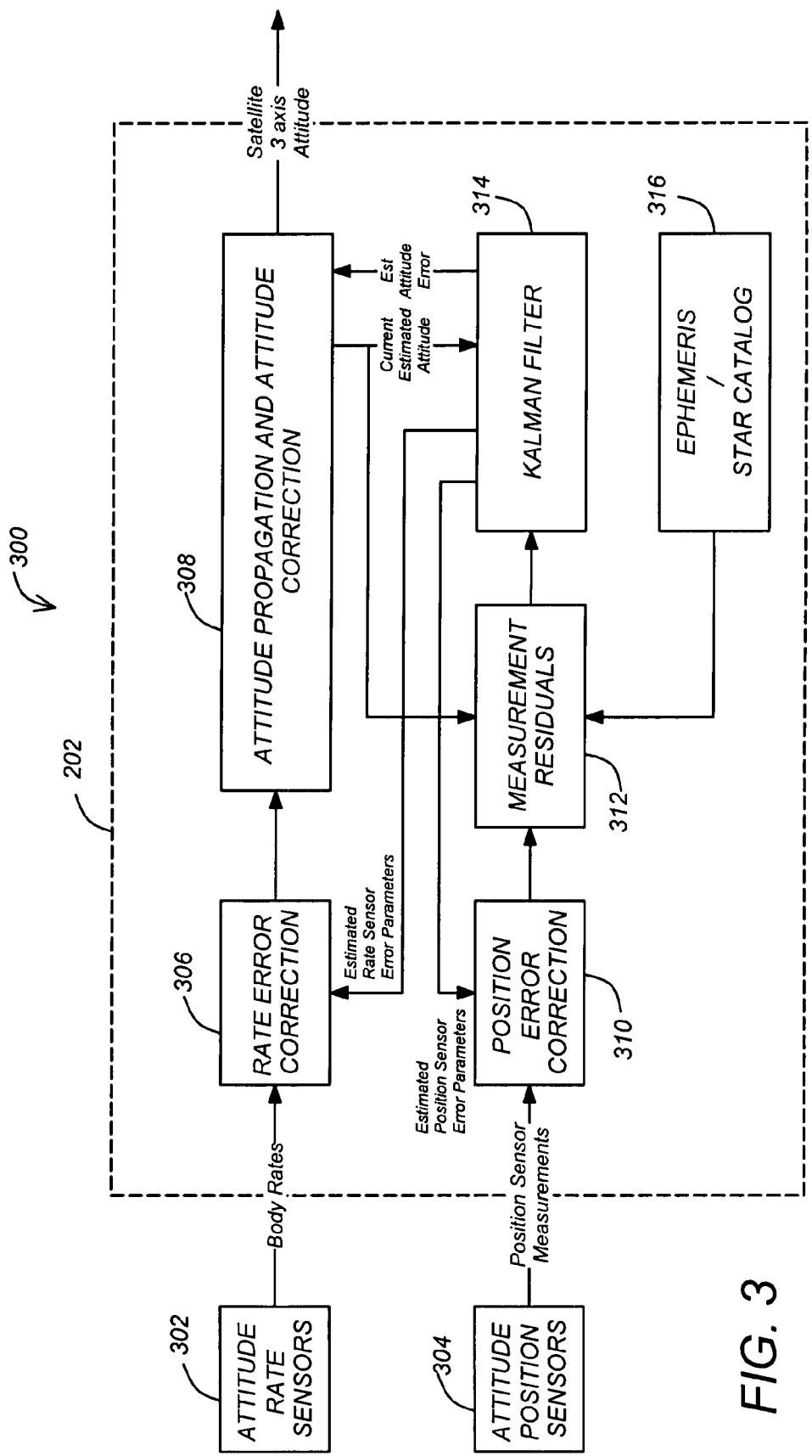
FIG. 3 is a diagram of a conventional satellite 3-axis attitude determination system 300.

FIG. 3 is a diagram of a conventional satellite 3-axis attitude determination system 300. The attitude determination system 3200 includes one or more (typically three) attitude rate sensors 302 such as rate gyros, and one or more (typically two) attitude position sensors 304. The attitude rate sensors 302 may be packaged together in an inertial measurement unit, and typically provide measurements of the satellite angular rate in three orthogonal directions. The attitude position sensors 304 could include sun sensors 204, 214, Earth sensors 210, 212 and star sensors 218. Position sensor measurements from the attitude position sensors 304 are provided to a position error correction module 310. The position error correction module 310 uses estimated positions sensor error parameters from the Kalman Filter 314 to generate corrected attitude position measurements. These corrected attitude position measurements are provided to a measurement residual module 312, which computes measurement residuals from the difference between the corrected attitude position measurements and the current estimated attitude from the attitude propagation, attitude correction module 308, and the ephemeris/star catalog module, 316. These measurement residuals are provided to a Kalman Filter 314. The Kalman Filter 314 generates estimated attitude errors, estimated attitude position sensor error parameters, and estimated rate sensor error parameters using the current measurement residuals and the computed Kalman filter gains.

The estimated rate sensor error parameters are provided to a rate error correction module 306 which accepts satellite attitude rate measurements from the attitude rate sensors 302, and provides the corrected satellite attitude rate measurements to the attitude propagation and attitude correction module 308. The satellite attitude propagation and attitude correction module 308 uses this information, along with the estimated attitude errors from the Kalman Filter 314 to generate an updated estimate of the satellite attitude.

As described above, it is challenging to provide accurate determinations of the satellite's attitude in three axes in the presence of man-made nuclear environments (both distant-burst and near-burst). Star trackers do not operate in harsh environments with man-made nuclear events, and other attitude position sensors (such as Earth sensors and Sun sensors) do not provide adequate accuracy. Other systems have used crosslink data to determine the attitude of the host satellite, but such systems were incapable of providing the necessary accuracy, and their data was not combined with the data from other sensors to arrive at an accurate, survivable estimate of the satellite attitude.

Figure 4:
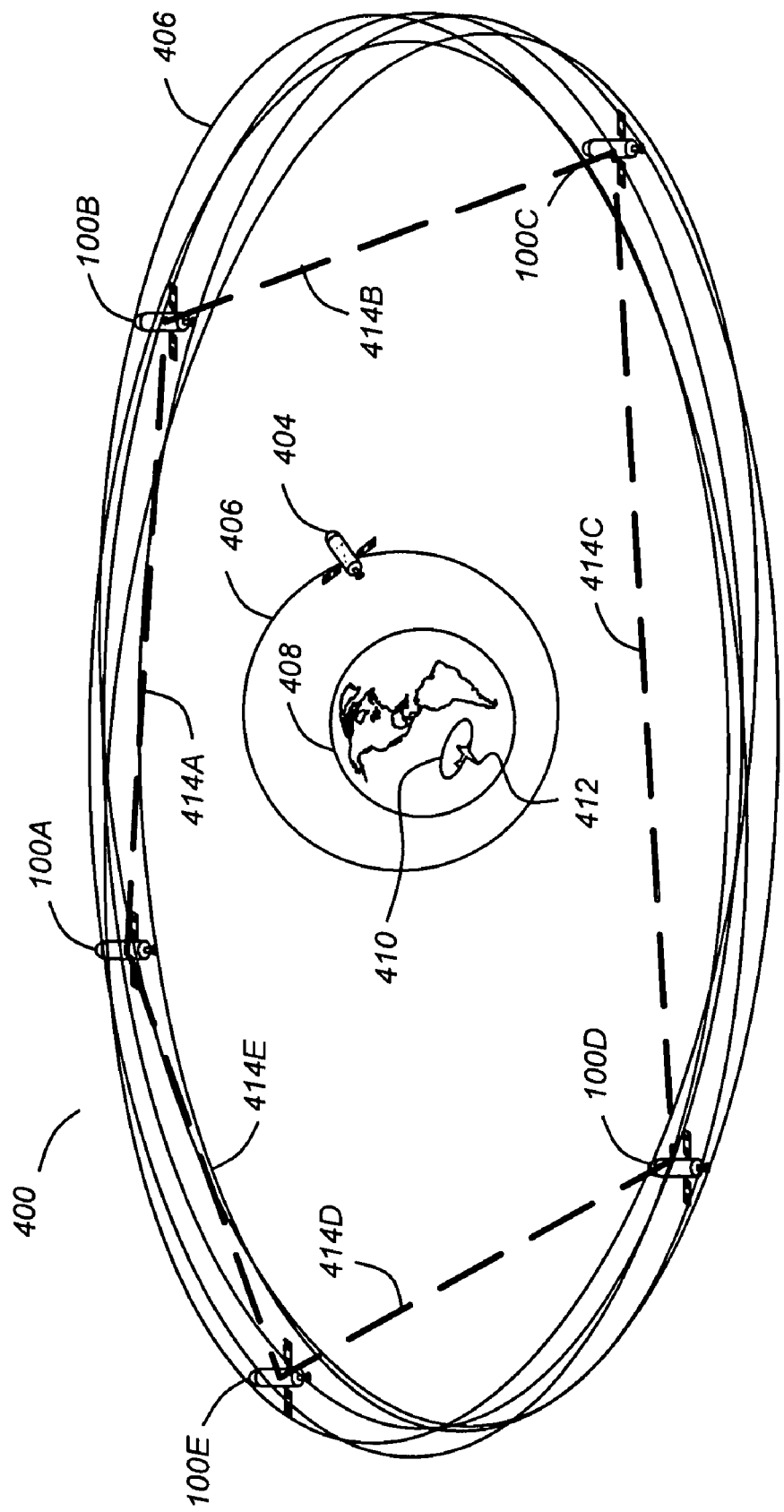
FIG. 4 is a diagram illustrating a satellite constellation that allows its member satellites to determine their attitudes using crosslink reference signals.

FIG. 4 is a diagram illustrating a satellite constellation 400 that allows its member satellites 100A-100E (hereinafter alternatively referred to as satellite(s) 100) to determine their attitudes using crosslink reference signals 414A-414D. Satellites 100 provide communications employing radio frequency (RF) and optical links to communicate with, and provide communications between, assets on the Earth 408. In the exemplary constellation, five satellites 100 are connected via survivable laser crosslinks 414A-414D to form a ring topology in a Geosynchronous Earth Orbit (GEO) constellation, and provide coverage over the Earth from 65 degrees South latitude to 65 degrees North latitude 24 hours per day. The laser communications (lasercom) crosslinks 414A-414D support high data rate communications among the satellites 100, and between other satellites 404 in non-geosynchronous orbits 406 and/or aircraft platforms 412 flying in paths 410 in the Earth's atmosphere.

The present invention utilizes information available on the crosslinks 414A-414D to augment the attitude determination capabilities of the 3-axis attitude determination system 300. Embodiments of how this is accomplished are presented below.

Figure 5:
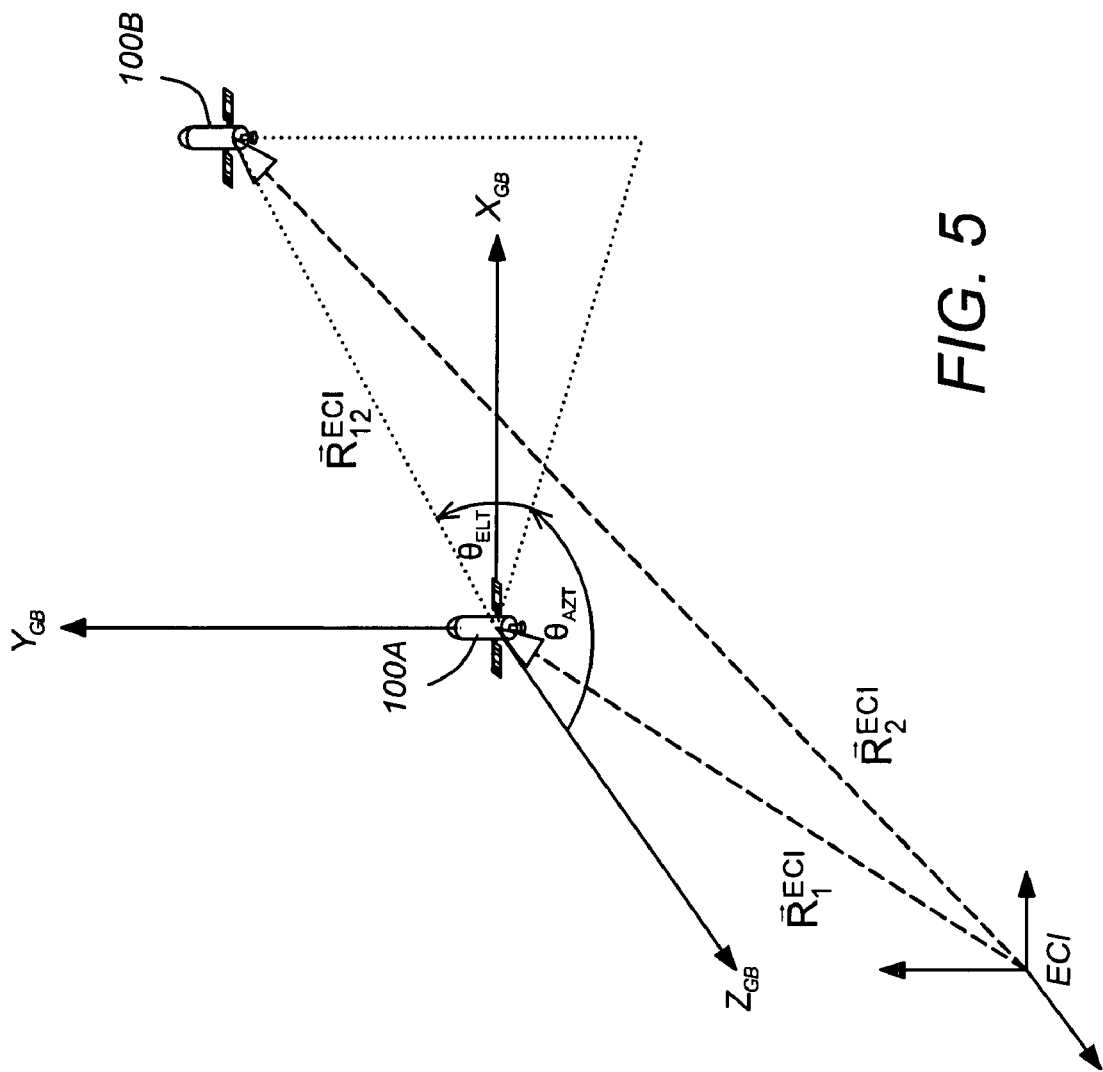
FIG. 5 is a diagram of showing the geometrical relationship between the a first (host) satellite and a second satellite.

FIG. 5 is a diagram showing the geometrical relationship between a first (host) satellite 100A and a second satellite 100B. $\vec{R}_1^{ECI}$ is a vector between the center of the Earth 408 and the host satellite 100A in Earth centered inertial (ECI) coordinates. $\vec{R}_2^{ECI}$ is a vector between the center of the Earth 408 and the second satellite 100B in ECI coordinates. $\vec{R}_{12}^{ECI}$ is a vector between the host satellite 100A and the second satellite 100B in ECI coordinates, and represents the line of sight between the host satellite 100A and the second satellite 100B. That line of sight can be expressed in crosslink subsystem coordinates in terms of an azimuth angle $\theta_{AZ}$ and an elevation angle $\theta_{EL}$, as shown. In cases where the crosslink transceivers are gimbaled, the azimuth angle $\theta_{AZ}$ and the elevation angle $\theta_{EL}$ represent the crosslink gimbal azimuth and elevation angles.

Figure 6:
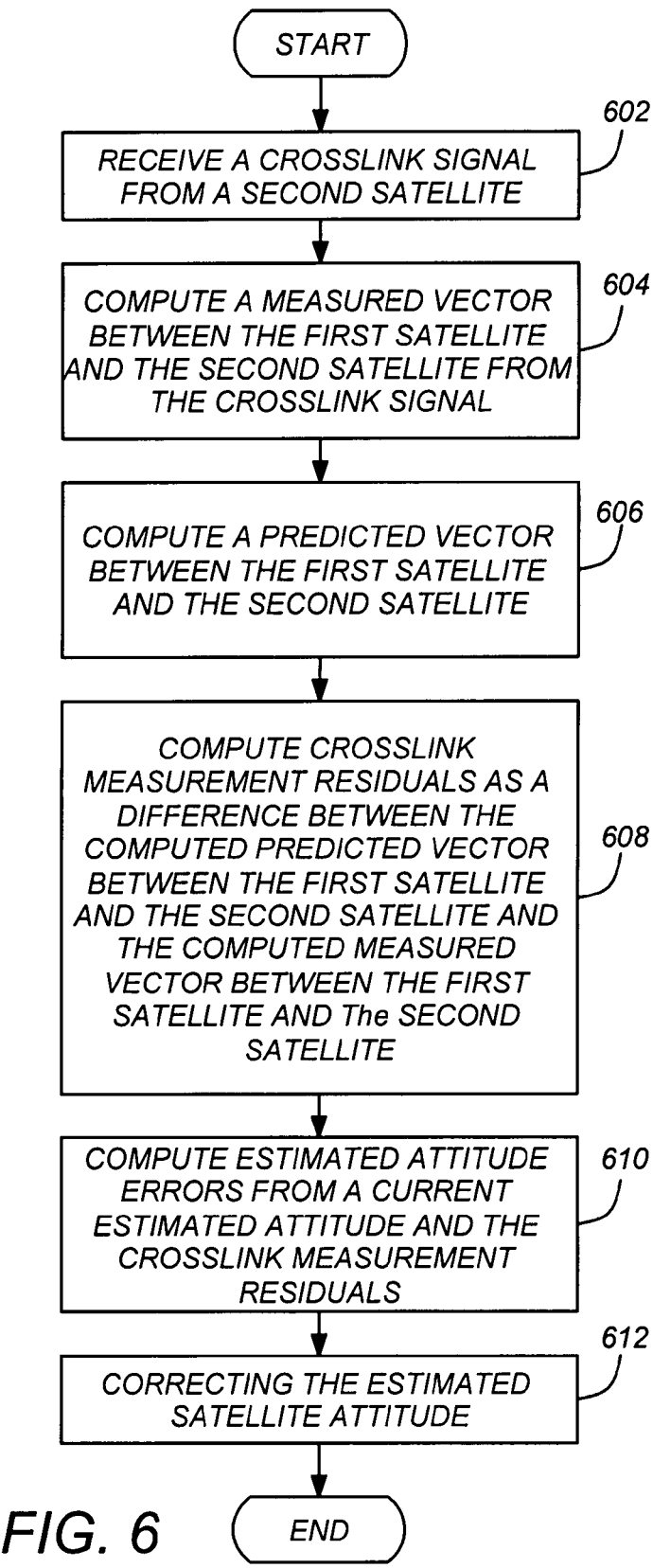
FIG. 6 is a flow chart illustrating one embodiment of a method for determining a satellite's attitude.

FIG. 6 is a flow chart illustrating one embodiment of a method for determining a satellite's attitude. The process shown in FIG. 6 will also be described with reference to FIG. 7, which illustrates another embodiment of a satellite 3-axis attitude determination system 700.

First, after the crosslink tracking between the two satellites has been established, a crosslink signal is received from a second satellite 100B by a crosslink receiver or terminal 702 as shown in step 602. In one embodiment the signal includes ephemeris data regarding the second satellite's orbit (which can be used to compute the position of the second satellite). In another embodiment, ephemeris data is not obtained directly from the crosslink signal, but rather computed using the time-of-arrival of the crosslink signal (which provides the range between the first satellite 100A and the second satellite) and the measured line of sight between the first satellite and the second satellite.

Next, a measured unit vector, $\hat{r}^{GB}$, between the first satellite 100A and the second satellite 100B expressed in the gimbal coordinate frame is computed as shown in step 604:

$$\hat{r}^{GB} = [C_y(\theta_{AZ})][C_y\theta_{EL})] \begin{bmatrix} 0 \\ 0 \\ 1 \end{bmatrix}$$

where $\theta_{AZ}$ and $\theta_{EL}$ are the measured gimbal azimuth and elevation angles, respectively, and:

$$[C_y(\theta_{AZ})] = \begin{bmatrix} \cos(\theta_{AZ}) & 0 & \sin(\theta_{AZ}) \\ 0 & 1 & 0 \\ -\sin(\theta_{AZ}) & 0 & \cos(\theta_{AZ}) \end{bmatrix}$$

and $$[C_X(\theta_{EL})] = \begin{bmatrix} 1 & 0 & 0 \\ 0 & \cos(\theta_{EL}) & -\sin(\theta_{EL}) \\ 0 & \sin(\theta_{EL}) & \cos(\theta_{EL}) \end{bmatrix}.$$

This measured unit vector may then be converted into a unit vector expressed in the satellite body reference frame in 704 as follows:

$$\hat{r}^{Body} = [\hat{C}_{Body\_GB}]\hat{r}^{GB}$$

where $[\hat{C}_{Body\_GB}]$ is a 3×3 direction cosine matrix that represents a known attitude between the crosslink gimbal reference frame and the satellite body reference frame. This direction cosine matrix can be calibrated through other independent measurements, and may be aided by estimated crosslink terminal error parameters available from the Kalman Filter 708.

Next, as shown in step 606, a predicted vector $\tilde{r}_{12}^{ECI}$ between the host satellite 100A and the second satellite 100B is computed. This can be accomplished as follows:

$$\tilde{r}_{12}^{ECI} = \frac{\tilde{R}_2^{ECI} - \tilde{R}_1^{ECI}}{|\tilde{R}_2^{ECI} - \tilde{R}_1^{ECI}|}$$

This may be converted into satellite body coordinates as follows:

$$\tilde{r}^{Body} = [\hat{C}_{Body\_ECI}]\tilde{r}_{12}^{ECI}$$

Where $\tilde{R}_2^{ECI}$ is the received ephemeris data from the crosslink signal regarding the second satellite's position; and $[\hat{C}_{Body\_ECI}]$ is the 3×3 direction cosine matrix that represents the bus inertial attitude.

In step 608, crosslink measurement residuals $\Delta r$ are computed as a difference between the computed predicted first vector between the host satellite 100A and the second satellite 100B, and the computed measured vector between the host satellite 100A and the second satellite 100B as follows:

$$\Delta r = \hat{r}^{Body} - \tilde{r}^{Body}$$

Figure 7:
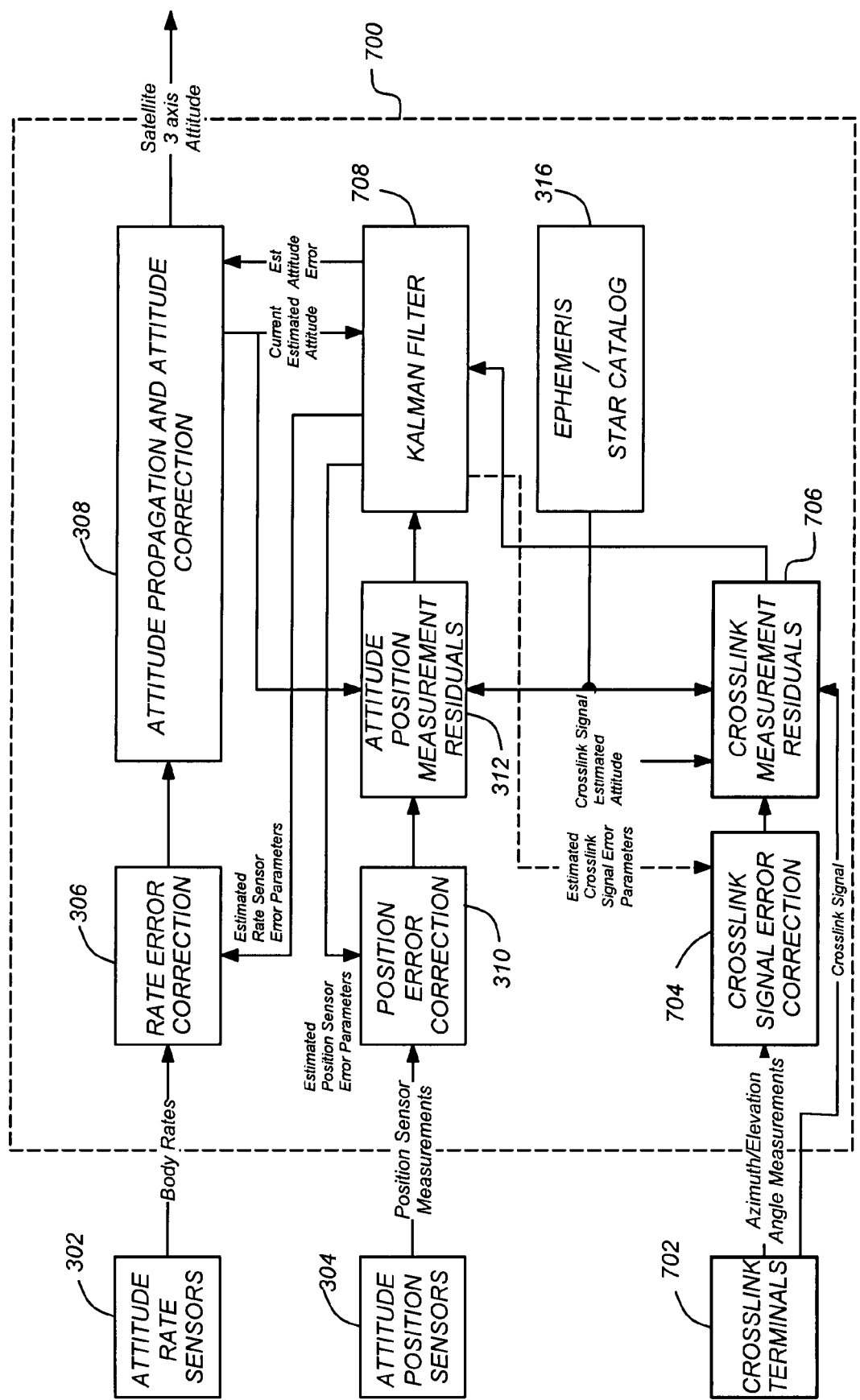
FIG. 7 illustrates another embodiment of a satellite 3-axis attitude determination system 700.

Steps 606 and 608 may be performed, for example, by the crosslink measurement residual module 706 shown in FIG. 7.

In step 610, estimated attitude errors are computed from a current estimated attitude and the crosslink measurement residuals $\Delta r$ for example, by Kalman Filter 708. In the embodiment illustrated in FIG. 7, the estimated attitude errors are computed from a current estimated attitude obtained from the attitude propagation and attitude correction module 308, the crosslink measurement residuals obtained from the crosslink residual module 706, and attitude position sensor measurement residuals obtained from the attitude position measurement residual module 312. Also, the attitude position sensor measurement residuals may be computed from the current estimated attitude from the attitude propagation and attitude correction module 308, the position sensor error parameters from the Kalman Filter 708, and star catalog/ephemeris information from the star catalog/ephemeris module 316.

Finally, in step 612, the current estimated satellite attitude is corrected using the computed estimated attitude errors.

Figure 8:
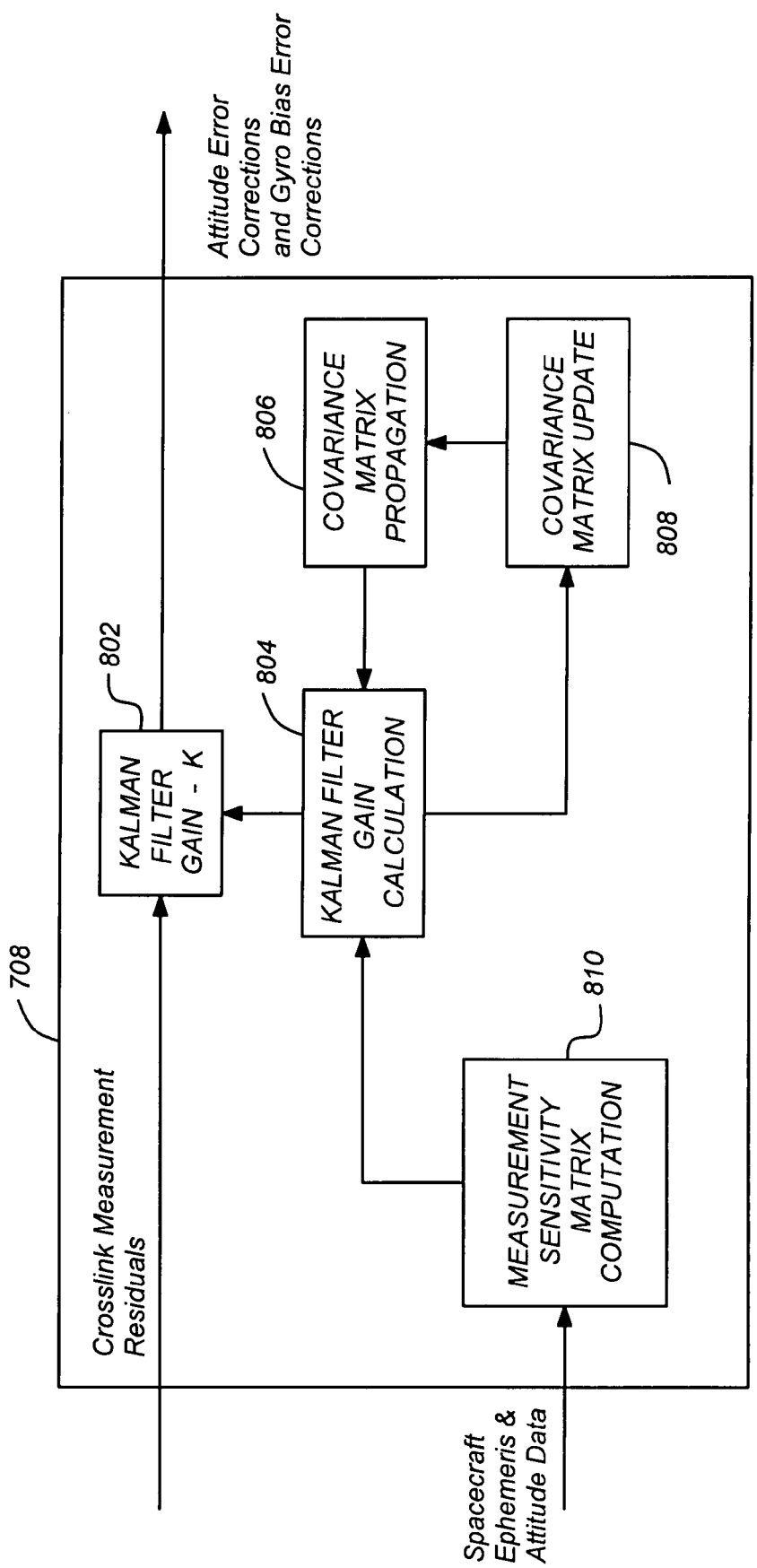
FIG. 8 is a diagram of one embodiment of a Kalman Filter.

FIG. 8 is a diagram of one embodiment of the Kalman Filter 708. First, satellite 100A ephemeris and attitude data is provided to a module 810 that computes the measurement sensitivity matrix, $H_k$ (for a 6-state Kalman filter design) at time step k as follows:

$$H_k = \lfloor \lfloor \hat{C}_{Body\_ECI}][\text{skew}\_\tilde{r}_{12}^{ECI}]0_{3 \times 3} \rfloor$$

$$\text{skew}\_\tilde{r}_{12}^{ECI} = \begin{bmatrix} 0 & \tilde{r}_{12}^{ECI}(3) & -\tilde{r}_{12}^{ECI}(2) \\ -\tilde{r}_{12}^{ECI}(3) & 0 & \tilde{r}_{12}^{ECI}(1) \\ \tilde{r}_{12}^{ECI}(2) & -\tilde{r}_{12}^{ECI}(1) & 0 \end{bmatrix}$$

This information is provided to module 804, which computes the Kalman filter gain matrix, $K_k$:

$$K_k = P_k(-)H_k^T[H_k P_k(-)H_k^T + R]^{-1}$$

using the current covariance matrix, $P_k(-)$ provided by the covariance matrix propagation module, module 806. R is the measurement noise covariance matrix, whose values are functions of satellite ephemeris errors and gimbal angle measurement errors. The module 806 computes the current covariance matrix, $P_k(-)$ using the previously updated covariance matrix, $P_{k-1}(+)$ provided by covariance matrix update module, module 808:

$$P_k(-) = \Phi_{k-1} P_{k-1}(+) \Phi_{k-1}^T + Q$$

$$\Phi_{k-1} = \begin{bmatrix} I_{3 \times 3} & \hat{C}_{Body\_ECI}^T \Delta t \\ 0_{3 \times 3} & I_{3 \times 3} \end{bmatrix}$$

where Q is the process noise covariance matrix whose values are functions of attitude rate sensor errors. The covariance matrix update module 808 computes the updated covariance matrix, $P_k(+)$ using the Kalman filter gain matrix, $K_k$ provided by module 804:

$$P_k(+) = (1 - K_k H_k) P_k(-)$$

Crosslink measurement residuals $\Delta r$ are provided from module 706 to a Kalman filter gain module 802. The crosslink measurement residuals $\Delta r$ are multiplied by the Kalman filter gain K and output as attitude error corrections and gyro bias error corrections.

It is noted that although the foregoing has been described with respect to a satellite obtaining attitude data from crosslink information from satellites in the same constellation, the foregoing techniques can be used with satellites in different constellations than the host satellite 100A or even with airborne platforms 412. Also, while the foregoing system and method have been described as applied to a satellite, the foregoing techniques can also be applied to any spacecraft (e.g. that do not orbit the Earth). Further, while the foregoing discloses a system and method using a Kalman filter, other optimal filter regimes could be used to implement the processes described above. In a further embodiment, satellite crosslink data may be used only upon detection of an event that might compromise the data obtained from conventional attitude position sensors such as star trackers. Finally, although the crosslink receiver "gimbal angles" are typically thought of as with reference to a mechanically gimbaled crosslink receiver antenna, the "gimbal angles" may also refer the angles off of the boresight of a phased array antenna.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of determining the attitude of a first satellite, comprising the steps of:
    receiving a crosslink signal from a second satellite;
    computing a measured vector $\hat{r}^{Body}$ between the first satellite and the second satellite from the crosslink signal;
    computing a predicted vector $\tilde{r}^{Body}$ between the first satellite and the second satellite;
    computing crosslink measurement residuals $\Delta r$ as a difference between the computed predicted vector between the first satellite and the second satellite and the computed measured vector between the first satellite and the second satellite $\hat{r}^{Body} - \tilde{r}^{Body}$;
    computing estimated attitude errors from a current estimated attitude, the crosslink measurement residuals, and position sensor measurement residuals, wherein the position sensor measurement residuals are computed from the current estimated attitude the attitude position sensor error parameters and the crosslink measurement residuals $\Delta r$; and
    correcting and propagating the current estimated satellite attitude using the computed estimated attitude errors.

2. The method of claim 1, wherein the first satellite and second satellite are in the same satellite constellation.

3. The method of claim 1, wherein the first satellite and second satellite are in different satellite constellations.

4. The method of claim 1, wherein the measured vector between the first satellite and the second satellite is computed according to $\hat{r}^{Body} = [\hat{C}_{Body\_GB}]\hat{r}^{GB}$, wherein $[\hat{C}_{Body\_GB}]$ is a 3×3 direction cosine matrix representing a known attitude between a reference frame of a device receiving the crosslink signal and a satellite body reference frame of the satellite and $\hat{r}^{GB}$ is a vector from between the antenna and the second satellite.

5. The method of claim 4, wherein the predicted vector $\tilde{r}^{Body}$ between the first satellite and the second satellite is computed from a current first spacecraft position vector, the second satellite position vector and the satellite attitude.

6. The method of claim 5, wherein the predicted vector between the first satellite and the second satellite is computed according to, $$[\hat{C}_{Body\_ECI}] \frac{\tilde{R}_2^{ECI} - \tilde{R}_1^{ECI}}{|\tilde{R}_2^{ECI} - \tilde{R}_1^{ECI}|}$$

wherein $\tilde{R}_1^{ECI}$ is the current first spacecraft position vector, $\tilde{R}_2^{ECI}$ is the current second satellite position vector, and $[\hat{C}_{Body\_ECI}]$ is a 3×3 direction cosine matrix representing the bus inertial attitude.

7. The method of claim 6, wherein the computed estimated attitude errors are computed using a Kalman filter.

8. An apparatus for determining the attitude of a first satellite, comprising:
    a receiver, disposed on a first satellite, the receiver for receiving a crosslink signal from a second satellite;
    a processor, having a plurality of modules, including:
        a first module for computing a measured vector $\hat{r}^{Body}$ between the first satellite and the second satellite from the crosslink signal;
        a second module for computing a predicted vector $\tilde{r}^{Body}$ between the first satellite and the second satellite;
        a third module for computing crosslink measurement residuals $\Delta r$ as a difference between the computed predicted vector between the first satellite and the second satellite and the computed measured vector between the first satellite and the second satellite $\hat{r}^{Body} - \tilde{r}^{Body}$;
        a third module for computing estimated attitude errors from a current estimated attitude, the crosslink measurement residuals, and position sensor measurement residuals, wherein the position sensor measurement residuals are computed from the current estimated attitude the position sensor error parameters and the crosslink measurement residuals $\Delta r$; and
        a fourth module for correcting and propagating the current estimated satellite attitude using the computed estimated attitude errors.

9. The apparatus of claim 8, wherein the first satellite and the second satellite are in the same satellite constellation.

10. The apparatus of claim 8, wherein the first satellite and the second satellite are in different satellite constellations.

11. The apparatus of claim 8, wherein the measured vector between the first satellite and the second satellite is computed according to $\hat{r}^{Body} = [\hat{C}_{Body\_GB}]\hat{r}^{GB}$, wherein $[\hat{C}_{Body\_GB}]$ is a 3×3 direction cosine matrix representing a known attitude between a reference frame of an antenna receiving the crosslink signal and a satellite body reference frame of the satellite and $\hat{r}^{GB}$ is a vector between the antenna and the second satellite.

12. The apparatus of claim 11, wherein the predicted vector $\tilde{r}^{Body}$ between the first satellite and the second satellite is computed from a current first spacecraft position vector, the second satellite position vector and the satellite attitude.

13. The apparatus of claim 12, wherein the predicted vector between the first satellite and the second satellite is computed according to $$[\hat{C}_{Body\_ECI}] \frac{\tilde{R}_2^{ECI} - \tilde{R}_1^{ECI}}{|\tilde{R}_2^{ECI} - \tilde{R}_1^{ECI}|},$$

wherein $\tilde{R}_1^{ECI}$ is the current first spacecraft position vector, $\tilde{R}_2^{ECI}$ is the current second satellite position vector, and $[\hat{C}_{Body\_ECI}]$ is a 3×3 direction cosine matrix representing the bus inertial attitude.

14. The apparatus of claim 13, wherein the computed estimated attitude errors are computed using a Kalman filter.

15. An apparatus of determining the attitude of a first satellite, comprising:
- means capable of receiving a crosslink signal from a second satellite;
- means capable of computing a measured vector $\hat{r}^{Body}$ between the first satellite and the second satellite from the crosslink signal;
- means capable of computing a predicted vector $\tilde{r}^{Body}$ between the first satellite and the second satellite;
- means capable of computing crosslink measurement residuals Δr as a difference between the computed predicted vector between the first satellite and the second satellite and the computed measured vector between the first satellite and the second satellite $\hat{r}^{Body} - \tilde{r}^{Body}$;
- means capable of computing estimated attitude errors from a current estimated attitude, the crosslink measurement residuals, and position sensor measurement residuals, wherein the position sensor measurement residuals are computed from the current estimated attitude the position sensor error parameters and the crosslink measurement residuals Δr; and
- means capable of correcting and propagating the current estimated satellite attitude using the computed estimated attitude errors.

16. The apparatus of claim 15, wherein the first satellite and the second satellite are in the same satellite constellation.

17. The apparatus of claim 15, wherein the first satellite and the second satellite are in different satellite constellations.

18. The apparatus of claim 15, wherein the measured vector between the first satellite and the second satellite is computed according to $\hat{r}^{Body} = [\hat{C}_{Body\_GB}]\hat{r}^{GB}$, wherein $[\hat{C}_{Body\_GB}]$ is a 3×3 direction cosine matrix representing a known attitude between a reference frame of the means capable of receiving the crosslink signal and a satellite body reference frame of the satellite and $\hat{r}^{GB}$ is a vector from between the antenna and the second satellite.

19. The apparatus of claim 18, wherein the predicted vector $\tilde{r}^{Body}$ between the first satellite and the second satellite is computed from a current first spacecraft position vector, the second satellite position vector and the satellite attitude.

20. The apparatus of claim 19, wherein the predicted vector between the first satellite and the second satellite is computed according to $$[\hat{C}_{Body\_ECI}] \frac{\tilde{R}_2^{ECI} - \tilde{R}_1^{ECI}}{|\tilde{R}_2^{ECI} - \tilde{R}_1^{ECI}|},$$

wherein $\tilde{R}_1^{ECI}$ is the current first spacecraft position vector, $\tilde{R}_2^{ECI}$ is the current second satellite position vector, and $[\tilde{C}_{Body\_ECI}]$ is a 3×3 direction cosine matrix representing the bus inertial attitude.

21. The apparatus of claim 20, wherein the computed estimated attitude errors are computed using a Kalman filter.

22. The apparatus of claim 15, wherein the receiver is gimbaled, and wherein the measured vector between the first satellite and the second satellite is computed from the angle of the gimbal.

* * * * *